United States Patent
Lomeli et al.

(10) Patent No.: US 12,538,482 B2
(45) Date of Patent: Jan. 27, 2026

(54) MICROELECTRONIC DEVICES INCLUDING STACK STRUCTURES HAVING STRENGTHENED INTERMEDIATE REGIONS OF ASSOCIATED INSULATIVE STRUCTURES, AND RELATED SYSTEMS

(71) Applicant: Micron Technology, Inc., Boise, ID (US)

(72) Inventors: Nancy M. Lomeli, Boise, ID (US); Jiewei Chen, Meridian, ID (US); Naiming Liu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 482 days.

(21) Appl. No.: 17/655,222

(22) Filed: Mar. 17, 2022

(65) Prior Publication Data

US 2023/0209819 A1 Jun. 29, 2023

Related U.S. Application Data

(60) Provisional application No. 63/266,029, filed on Dec. 27, 2021.

(51) Int. Cl.
| | |
|---|---|
| *H10B 41/27* | (2023.01) |
| *G11C 5/02* | (2006.01) |
| *G11C 5/06* | (2006.01) |
| *H01L 23/538* | (2006.01) |
| *H10B 43/27* | (2023.01) |

(52) U.S. Cl.
CPC ............ *H10B 41/27* (2023.02); *G11C 5/025* (2013.01); *G11C 5/06* (2013.01); *H01L 23/5386* (2013.01); *H10B 43/27* (2023.02)

(58) Field of Classification Search
CPC .......... G11C 5/025; G11C 5/06; H10B 41/27; H10B 43/27
See application file for complete search history.

(56) References Cited

U.S. PATENT DOCUMENTS

| | | | | |
|---|---|---|---|---|
| 2013/0270703 | A1* | 10/2013 | Zierath | H01L 21/76831 438/653 |
| 2015/0102282 | A1* | 4/2015 | Zhang | H10B 63/845 257/5 |
| 2018/0076264 | A1* | 3/2018 | Sasaki | H10N 70/20 |
| 2020/0373325 | A1* | 11/2020 | Kim | H01L 29/40117 |
| 2020/0388627 | A1* | 12/2020 | Hopkins | H10B 43/27 |
| 2021/0375926 | A1* | 12/2021 | Mehandru | H10B 51/20 |

OTHER PUBLICATIONS

Entegris White Paper, "Considerations for Improving 3D NAND Performance, Reliability, and Yield", https://info.entegris.com/white-paper-considerations-for-improving-3d-nand-performance-yield-and-reliability (Jun. 7, 2019) 7 pages.

* cited by examiner

*Primary Examiner* — Ratisha Mehta
*Assistant Examiner* — Mikka Liu
(74) *Attorney, Agent, or Firm* — TraskBritt

(57) ABSTRACT

A microelectronic device includes a stack structure including insulative structures and conductive structures vertically alternating with the insulative structures. At least one of the insulative structures includes interfacial regions proximate interfaces between the at least one of the insulative structures and two of the conductive structures vertically neighboring the at least one of the insulative structures; and an intermediate region interposed between the interfacial regions. The intermediate region has a different material composition and relatively greater strength than the interfacial regions.

16 Claims, 11 Drawing Sheets

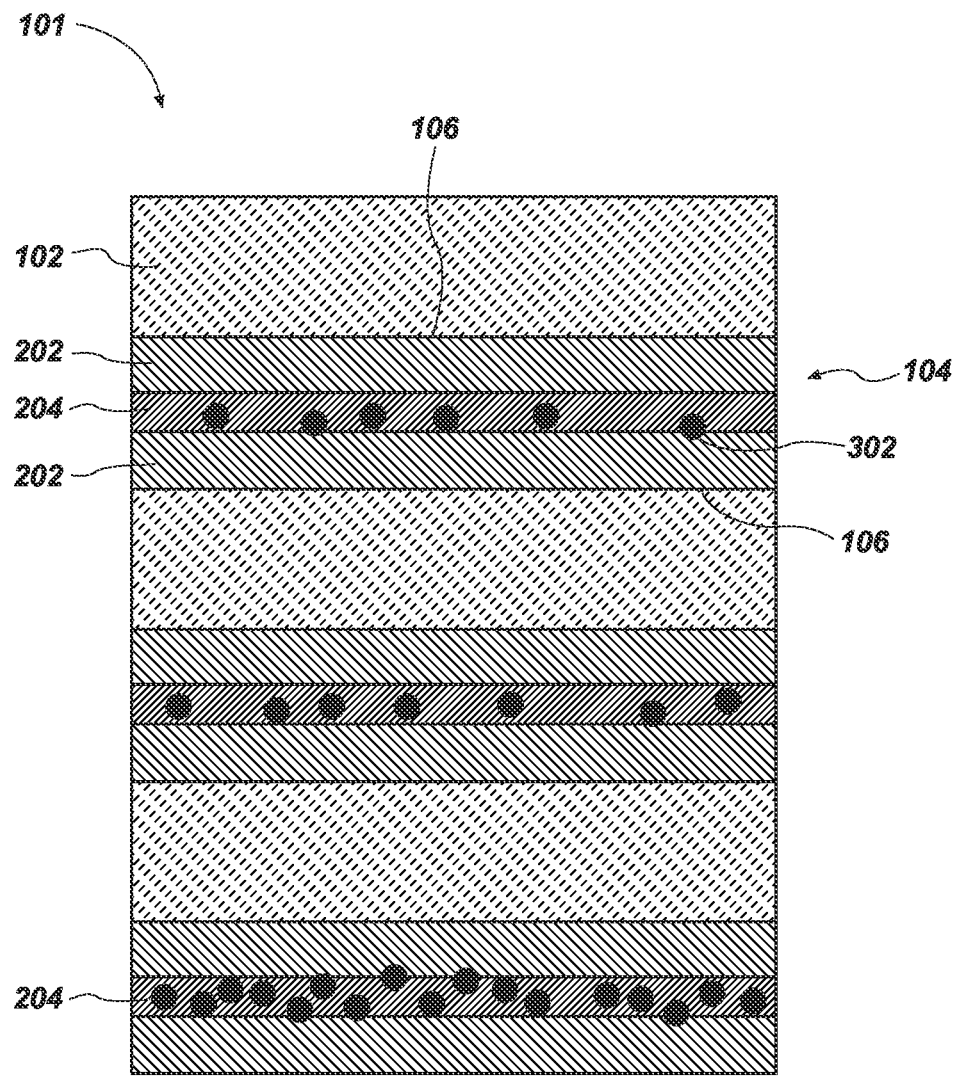
FIG. 3A
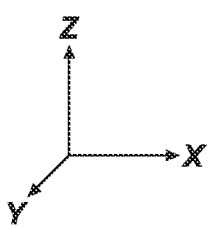

MICROELECTRONIC DEVICES INCLUDING STACK STRUCTURES HAVING STRENGTHENED INTERMEDIATE REGIONS OF ASSOCIATED INSULATIVE STRUCTURES, AND RELATED SYSTEMS

CROSS-REFERENCE TO RELATED APPLICATION

This application claims the benefit under 35 U.S.C. § 119(e) of U.S. Provisional Patent Application Ser. No. 63/266,029, filed Dec. 27, 2021, the disclosure of which is hereby incorporated herein in its entirety by this reference.

TECHNICAL FIELD

Embodiments of the disclosure generally relate to microelectronic devices. In particular, embodiments of the disclosure relate to microelectronic devices including stack structures, and associated systems and methods.

BACKGROUND

Microelectronic device designers often desire to increase the level of integration or density of features within a microelectronic device by reducing the dimensions of the individual features and by reducing the separation distance between neighboring features. In addition, microelectronic device designers often desire to design architectures that are not only compact, but offer performance advantages, as well as simplified, easier and less expensive to fabricate designs.

One example of a microelectronic device is a memory device. Memory devices are generally provided as internal integrated circuits in computers or other electronic devices. There are many types of memory devices including, but not limited to, non-volatile memory (NVM) devices, such as flash memory devices (e.g., NAND flash memory devices). One way of increasing memory density in non-volatile memory devices is to utilize vertical memory array (also referred to as a "three-dimensional (3D) memory array") architectures. A conventional vertical memory array includes vertical memory strings extending through openings in one or more decks (e.g., stack structures) including conductive structures and insulative structures vertically alternating with the conductive structures. Each vertical memory string may include at least one select device coupled in series to a serial combination of vertically stacked memory cells. Such a configuration permits a greater number of switching devices (e.g., transistors) to be located in a unit of die area (i.e., length and width of active surface consumed) by building the array upwards (e.g., vertically) on a die, as compared to structures with conventional planar (e.g., two-dimensional) arrangements of transistors.

As dimensions, such as thicknesses of structures, are reduced, the rigidity of the structures may be reduced particularly when unsupported, such as during or after so-called "replacement gate" processing. In some cases, one or more tiers of the stack structures associated with the vertical memory array may undesirably collapse during the formation process.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

FIG. 3A through FIG. 3C illustrate partial cross-sectional views of a microelectronic device structure at different process stages of a method of forming a microelectronic device, in accordance with embodiments of the disclosure;

DETAILED DESCRIPTION

Figure 1:
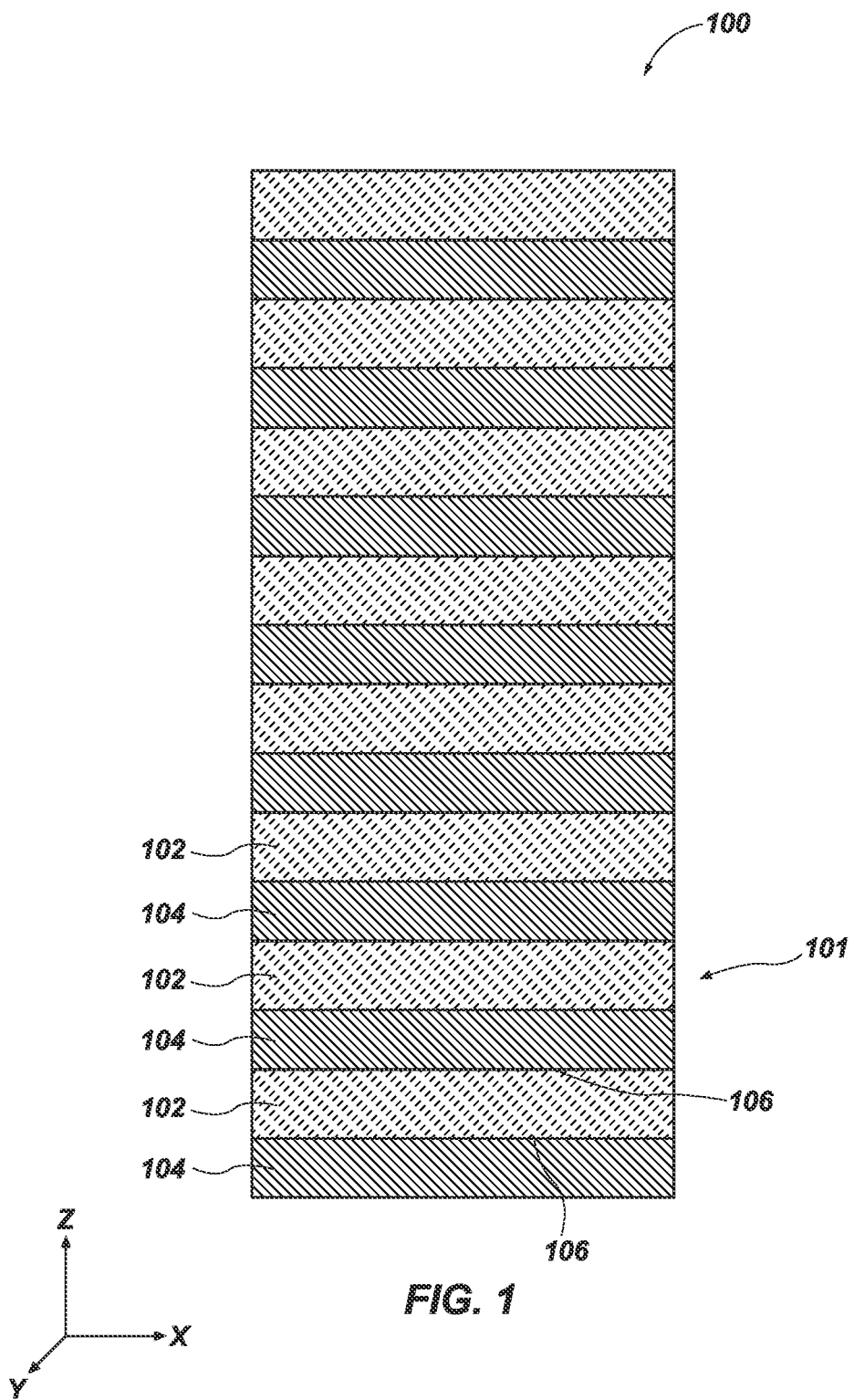
FIG. 1 illustrates a simplified, partial cross-sectional view of a microelectronic device structure for a microelectronic device, in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional microelectronic device fabrication techniques employed in the industry. In addition, the description provided below does not form a complete process flow for manufacturing a microelectronic device (e.g., a memory device). The structures described below do not form a complete microelectronic device. Only those process acts and structures necessary to understand the embodiments of the disclosure are described in detail below. Additional acts to form a complete microelectronic device from the structures may be performed by conventional fabrication techniques.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, a "memory device" means and includes microelectronic devices exhibiting memory functionality, but not necessarily limited to memory functionality. Stated another way, and by way of non-limiting example only, the term "memory device" includes not only conventional memory (e.g., conventional non-volatile memory; conventional volatile memory), but also includes an application specific integrated circuit (ASIC) (e.g., a system on a chip (SoC)), a microelectronic device combining logic and memory, and a graphics processing unit (GPU) incorporating memory.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the term "and/or" means and includes any and all combinations of one or more of the associated listed items.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the drawings, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

As used herein, "conductive material" means and includes electrically conductive material such as one or more of a metal (e.g., tungsten (W), titanium (Ti), molybdenum (Mo), niobium (Nb), vanadium (V), hafnium (Hf), tantalum (Ta), chromium (Cr), zirconium (Zr), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), aluminum (Al)), an alloy (e.g., a Co-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a magnesium (Mg)-based alloy, a Ti-based alloy, a steel, a low-carbon steel, a stainless steel), a conductive metal-containing material (e.g., a conductive metal nitride, a conductive metal silicide, a conductive metal carbide, a conductive metal oxide), and a conductively-doped semiconductor material (e.g., conductively-doped polysilicon, conductively-doped germanium (Ge), conductively-doped silicon germanium (SiGe)). In addition, a "conductive structure" means and includes a structure formed of and including conductive material.

As used herein, "insulative material" means and includes electrically insulative material, such one or more of at least one dielectric oxide material (e.g., one or more of a silicon oxide ($SiO_x$), phosphosilicate glass, borosilicate glass, borophosphosilicate glass, fluorosilicate glass, an aluminum oxide ($AlO_x$), a hafnium oxide ($HfO_x$), a niobium oxide ($NbO_x$), a titanium oxide ($TiO_x$), a zirconium oxide ($ZrO_x$), a tantalum oxide ($TaO_x$), and a magnesium oxide ($MgO_x$)), at least one dielectric nitride material (e.g., a silicon nitride ($SiN_y$)), at least one dielectric oxynitride material (e.g., a silicon oxynitride ($SiO_xN_y$)), at least one dielectric oxycarbide material (e.g., silicon oxycarbide ($SiO_xC_y$)), at least one hydrogenated dielectric oxycarbide material (e.g., hydrogenated silicon oxycarbide ($SiC_xO_yH_z$)), and at least one dielectric carboxynitride material (e.g., a silicon carboxynitride ($SiO_xC_zN_y$)). Formulae including one or more of "x," "y," and "z" herein (e.g., $SiO_x$, $AlO_x$, $HfO_x$, $NbO_{-x}$, $TiO_x$, $SiN_y$, $SiO_xN_y$, $SiO_xC_y$, $SiC_xO_yH_z$, $SiO_xC_zN_y$) represent a material that contains an average ratio of "x" atoms of one element, "y" atoms of another element, and "z" atoms of an additional element (if any) for every one atom of another element (e.g., Si, Al, Hf, Nb, Ti). As the formulae are representative of relative atomic ratios and not strict chemical structure, an insulative material may comprise one or more stoichiometric compounds and/or one or more non-stoichiometric compounds, and values of "x," "y," and "z" (if any) may be integers or may be non-integers. As used herein, the term "non-stoichiometric compound" means and includes a chemical compound with an elemental composition that cannot be represented by a ratio of well-defined natural numbers and is in violation of the law of definite proportions. In addition, an "insulative structure" means and includes a structure formed of and including insulative material.

As used herein, the term "homogeneous" means relative amounts of elements included in a feature (e.g., a material, a structure) do not vary throughout different portions (e.g., different horizontal portions, different vertical portions) of the feature. Conversely, as used herein, the term "heterogeneous" means relative amounts of elements included in a feature (e.g., a material, a structure) vary throughout different portions of the feature. If a feature is heterogeneous, amounts of one or more elements included in the feature may vary stepwise (e.g., change abruptly), or may vary continuously (e.g., change progressively, such as linearly, parabolically) throughout different portions of the feature. The feature may, for example, be formed of and include a stack of at least two different materials.

Unless the context indicates otherwise, the materials described herein may be formed by any suitable technique including, but not limited to, spin coating, blanket coating, chemical vapor deposition (CVD), plasma enhanced CVD (PECVD), atomic layer deposition (ALD), plasma enhanced ALD (PEALD), physical vapor deposition (PVD) (e.g., sputtering), or epitaxial growth. Depending on the specific material to be formed, the technique for depositing or growing the material may be selected by a person of ordinary skill in the art. In addition, unless the context indicates otherwise, removal of materials described herein may be accomplished by any suitable technique including, but not limited to, etching (e.g., dry etching, wet etching, vapor etching), ion milling, abrasive planarization (e.g., chemical-mechanical planarization (CMP)), or other known methods.

FIG. 1 illustrates a simplified, partial cross-sectional view of a microelectronic device structure 100 at a processing stage of a method of forming a microelectronic device (e.g., a memory device, such as a 3D NAND Flash memory device) of the disclosure, in accordance with embodiments of the disclosure. The microelectronic device structure 100 may include a preliminary stack structure 101 including insulative structures 104 and sacrificial structures 102 (e.g., additional insulative structures) vertically alternating (e.g., in the Z-direction) with the insulative structures 104.

The sacrificial structures 102 of the preliminary stack structure 101 may be formed of and include at least one material (e.g., at least one insulative material) that may be selectively removed relative to additional material (e.g., at least one additional insulative material) of the insulative structures 104. A material composition of the sacrificial structures 102 is different than a material composition of the insulative structures 104. The sacrificial structures 102 may be selectively etchable relative to the insulative structures 104 during common (e.g., collective, mutual) exposure to a first etchant, and the insulative structures 104 may be selectively etchable relative to the sacrificial structures 102 during common exposure to a second, different etchant. As used herein, a material is "selectively etchable" relative to another material if the material exhibits an etch rate that is at least about three times (3×) greater than the etch rate of another material, such as about five times (5×) greater, such as about ten times (10×) greater, about twenty times (20×) greater, or about forty times (40×) greater. As a non-limiting example, the sacrificial structures 102 may be formed of and include insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the sacrificial structures 102 is formed of and includes a dielectric nitride material, such as $SiN_y$ (e.g., $Si_3N_4$). Each of the sacrificial structures 102 may individually be substantially homogeneous or substantially heterogeneous.

The insulative structures 104 of the preliminary stack structure 101 may be formed of and include at least one insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the insulative structures 104 is formed of and includes a dielectric oxide material, such as $SiO_x$ (e.g., $SiO_2$). Each of the insulative structures 104 may be heterogeneous, as described in further detail below.

Figure 2:
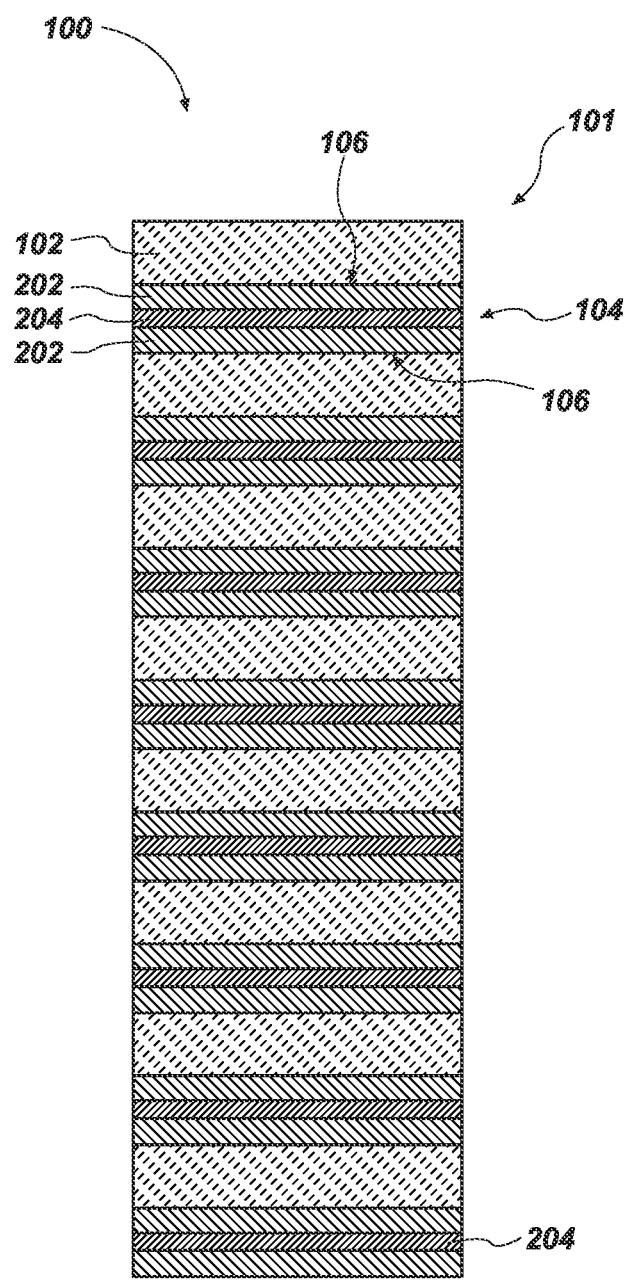
FIG. 2 illustrates an enlarged view of a section of the microelectronic device structure of FIG. 1.

FIG. 2 illustrates the preliminary stack structure 101, wherein the insulative structures 104 individually include an intermediate region 204 configured to increase one or more of a rigidity and a strength of the insulative structures 104. The intermediate region 204 may be located near a vertical center (e.g., in the Z-direction) of each of the respective insulative structures 104. Each of the insulative structures 104 may include interfacial regions 202 extending between the intermediate regions 204 and the interfaces 106 between the insulative structures 104 and adjacent sacrificial structures 102 (e.g., vertical boundaries of the insulative structures 104), such that the intermediate region 204 is located between the interfacial regions 202 of the same insulative structure 104.

The intermediate regions 204 may include at least one chemical species (e.g., at least one dopant) imparting the insulative structures 104 with one or more of higher strength and higher rigidity than the insulative material of the insulative structures 104 alone. In some embodiments, the intermediate regions 204 comprise chemically modified insulative material, such as doped insulative material. For example, intermediate region 204 of an individual insulative structure 104 may comprise insulative material doped with one or more of carbon, boron, and calcium fluoride. In some embodiments, the intermediate region 204 of each of the insulative structures 104 is formed of and includes carbon-doped silicon dioxide (C-doped $SiO_2$).

The intermediate region 204 of each insulative structure 104 may be less than about one third of the total vertical thickness of the insulative structure 104. In some embodiments, the intermediate regions 204 of at least some of the insulative structures 104 of the preliminary stack structure 101 has different properties than the intermediate regions 204 of at least some other of the insulative structures 104. For example, the intermediate region 204 of a bottom insulative structure 104 of the preliminary stack structure 101 may have one or more of a different material composition, a different material distribution, a different amount of dopant (e.g., a relatively greater amount of dopant), and different vertical thickness than the intermediate regions 204 of one or more relative vertically higher insulative structures 104 (e.g., intermediate insulative structures 104, upper insulative structures 104).

Figure 3B:
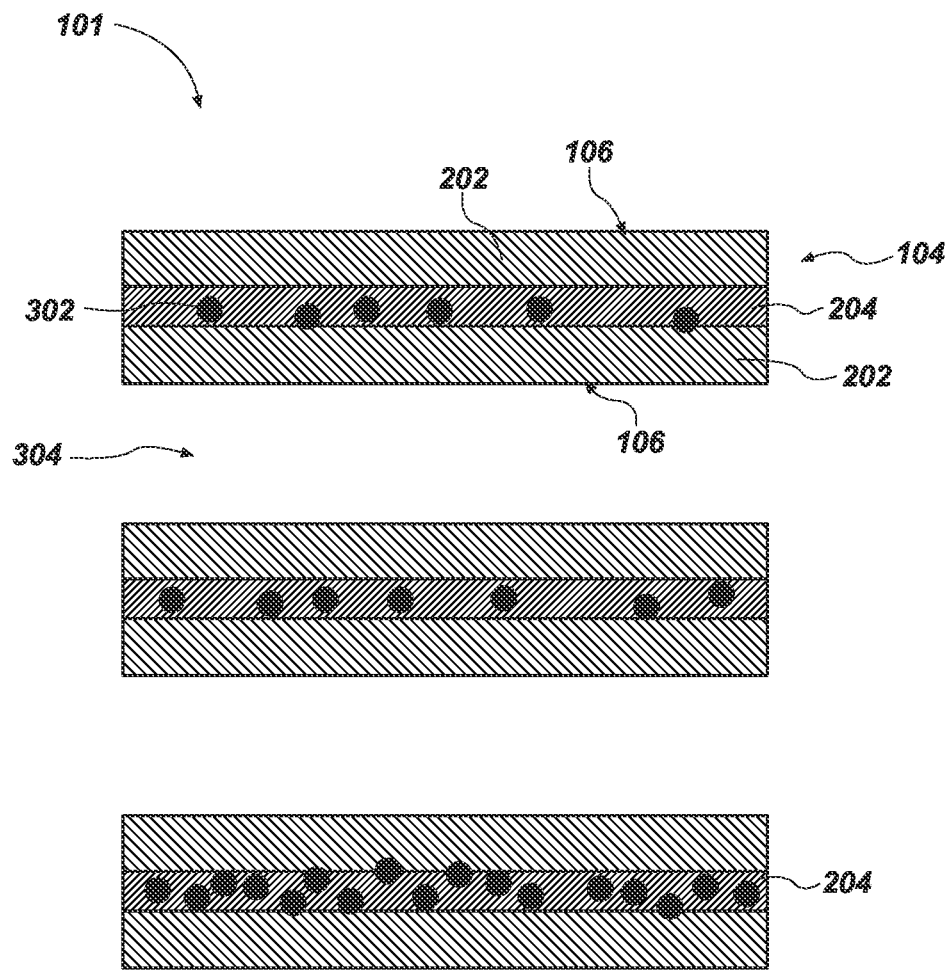
Figure 3B:
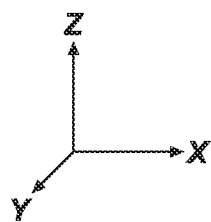
Figure 3C:
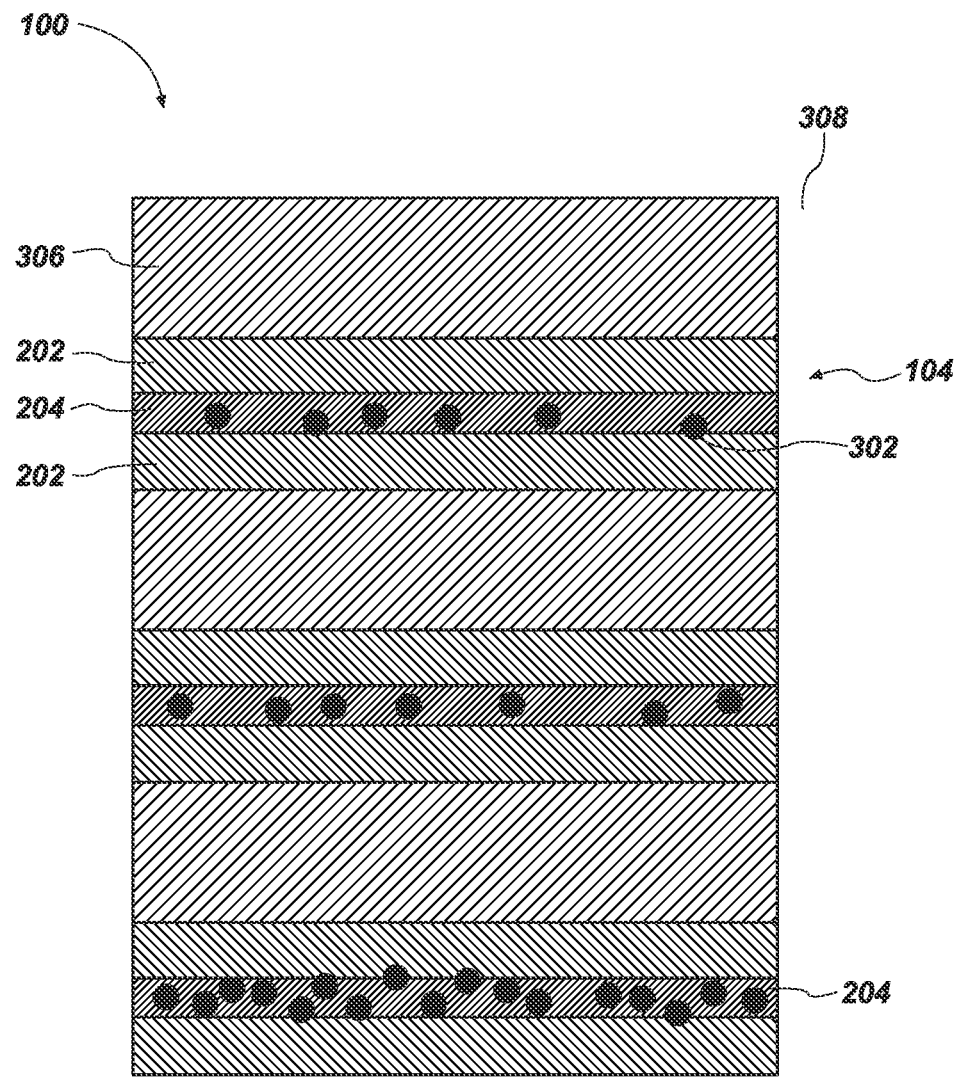

FIG. 3A through FIG. 3C are partial cross-sectional views illustrating different processing stages of a method of forming a microelectronic device structure for a microelectronic device, in accordance with embodiments of the disclosure. FIG. 3A illustrates an enlarged partial cross-sectional view of several of the insulative structures 104 and sacrificial structures 102 of the preliminary stack structure 101 previously described with reference to FIG. 2. As shown in FIG. 3A, the insulative structures 104 may include at least one dopant 302 dispersed within the intermediate regions 204 thereof. As described above, the intermediate regions 204 may be vertically interposed between interfacial regions 202 (e.g., non-central regions) of the insulative structures 104. The interfacial regions 202 may be at least partially (e.g., substantially) free of the dopant 302. The dopant 302 may be formulated and positioned to increase a rigidity of the insulative structures 104, which may help the insulative structures 104 to substantially maintain their shape when the sacrificial structures 102 are removed (e.g., during subsequent replacement gate processing). Substantially maintaining the shape of the insulative structures 104 when the sacrificial structures 102 are removed may substantially prevent undesirable tier collapse during and/or after the removal process.

Some of the insulative structures 104 of the preliminary stack structure 101 may have different concentrations of the dopant 302 in the intermediate regions 204 thereof than other of the insulative structures 104. For example, the intermediate region 204 of one or more relatively lower insulative structure(s) 104 (e.g., a lowermost insulative structure 104) may include a relatively higher concentration of dopant 302 than the intermediate region 204 of one or more relatively higher insulative structure(s) 104 of the preliminary stack structure 101. In stack structures, relatively lower insulative structures 104 may have a greater horizontal length (e.g., in the X-directions) than relatively higher insulative structures 104. Increasing the concentration of the dopant 302 in the intermediate region 204 of a relatively lower insulative structure 104, may increase the rigidity of the relatively lower insulative structure 104 as compared to relatively higher insulative structures 104 overlying the relatively lower insulative structure 104. Increasing the rigidity of relatively lower insulative structure 104 may reduce the risk of tier collapse across a horizontal length of the relatively lower insulative structure 104.

In some embodiments, a vertical thickness of the intermediate region 204 of one or more relatively lower insulative structure(s) 104 is greater than a vertical thickness of the intermediate region 204 of one or more of the relatively higher insulative structure(s) 104. The greater vertical thickness of the intermediate region 204 of the relatively lower insulative structure(s) 104 as compared to the intermediate region 204 of the relatively higher insulative structure(s) 104 may also increase the rigidity of the relatively lower insulative structure(s) 104 as compared to the relatively higher insulative structure(s) 104. In some embodiments, a lowermost insulative structure 104 has a vertical thickness that is greater than the vertical thickness of the of at least one (e.g., each) relatively higher insulative structure 104. The greater vertical thickness of the lowermost insulative structure 104 may facilitate both a relatively greater amount of dopant 302 and a relatively thicker intermediate region 204 within the lowermost insulative structure 104 as compared to the relatively higher insulative structure(s) 104. For example, the greater vertical thickness may provide additional space for doped insulative material of the intermediate region 204 while maintaining sufficient space for undoped insulative material of the interfacial regions 202.

Referring next to FIG. 3B, after forming the preliminary stack structure 101, the sacrificial structures 102 may be at least partially (e.g., substantially) selectively removed, such as through an etching process. In some embodiments, such as embodiment wherein the sacrificial structures 102 comprise a dielectric nitride material (e.g., $Si_3N_4$), the etching process includes a wet nitride strip with a wet etchant, such as hydrofluoric (HF) acid. Since the interfacial regions 202 of each insulative structure 104 are substantially free of the dopant 302, material removal along interfaces 106 between the sacrificial structures 102 (FIG. 3A) and the insulative structures 104 to be substantially uniform and predictable. This may result in the insulative structures 104 having a substantially uniform thickness along a horizontal length (e.g., in the X-direction) of the insulative structures 104, and a substantially planar boundaries (e.g., surfaces) along the interfaces 106 after the sacrificial structures 102 (FIG. 3A) are removed.

The selective removal of the sacrificial structures 102 (FIG. 3A) may effectuate the formation of cavities 304 (e.g., openings, void spaces) between vertically neighboring insulative structures 104. The dopant 302 in the intermediate regions 204 of the insulative structures 104 may strengthen the insulative structures 104, such that the insulative structures 104 may substantially retain their shapes when the sacrificial structures 102 are removed. Having the insulative structures 104 substantially retain their shapes may result in the cavities 304 having substantially the same shapes as the sacrificial structures 102 (FIG. 3A).

As described above, a one or more relatively lower insulative structure(s) 104 may individually have an intermediate region 204 that is different than the intermediate region 204 of one or more of the relatively higher insulative structure(s) 104 vertically thereover. The relatively lower insulative structure(s) 104 may span a greater horizontal distance (e.g., in the X-direction) than the relatively higher insulative structures 104 vertically thereover. After the sacrificial structures 102 are selectively removed, such that the relatively lower insulative structure(s) 104 may not be supported across one or more portions of the span, such as portions at least partially defining staircase regions (e.g., access line contact regions). As described above, forming the intermediate region 204 of relatively lower insulative structure(s) 104 to be different than the intermediate region 204 of relatively higher insulative structure(s) 104 may increase a rigidity of the relatively lower insulative structure(s) 104. Increasing the rigidity of the relatively lower insulative structure(s) 104 may mitigate sag or deflection across the one or more portions of the span of the relatively lower insulative structure(s) 104, substantially reducing the likelihood of individual relatively lower insulative structure(s) 104 collapsing into one of the cavities 304 formed vertically thereunder.

Referring next to FIG. 3C, the cavities 304 (FIG. 3B) may be filled with conductive material to form a stack structure 308 including conductive structures 306 vertically alternating with remaining portions of the insulative structures 104. The conductive material may comprise, for example, one or more of at least one metal, at least one metal alloy, at least one conductive metal oxide, at least one conductive metal nitride, at least one conductive metal silicide, and at least one conductively-doped semiconductor material. By way of non-limiting example, the conductive structures 306 may be formed of and include one or more of tungsten (W), tungsten nitride (WN), nickel (Ni), tantalum (Ta), tantalum nitride (TaN), tantalum silicide (TaSi), platinum (Pt), copper (Cu), silver (Ag), gold (Au), aluminum (Al), molybdenum (Mo), titanium (Ti), titanium nitride (TiN$_x$), titanium silicide (TiSi$_x$), titanium silicon nitride (TiSi$_x$N$_y$), titanium aluminum nitride (TiAl$_x$N$_y$), molybdenum nitride (MoN$_x$), iridium (Jr), iridium oxide (IrO$_x$), ruthenium (Ru), ruthenium oxide (RuO$_x$), and conductively-doped silicon. In some embodiments, the conductive structures 306 are formed of and include W. In additional embodiments, the conductive structures 306 are formed of and include TiN$_x$.

Thus, in accordance with embodiments of the disclosure, a method of forming a microelectronic device includes forming a first insulative material comprising silicon oxide. A second insulative material is formed over the first insulative material, the second material comprising additional silicon oxide doped with one or more of carbon and boron. A third insulative material comprising further silicon oxide is formed over the second insulative material, the second insulative material having a greater concentration of the one or more of carbon and boron than each of the first insulative material and the third insulative material. A fourth insulative material comprising silicon nitride is formed over the third insulative material. A fifth insulative material comprising still further silicon oxide is formed over the fourth insulative material. The fourth insulative material is selectively removed relative to each of the first insulative material, the second insulative material, the third insulative material, and the fifth insulative material to form a cavity. The cavity is filled with conductive material.

To maintain relatively lower concentrations of the dopant 302 in the interfacial regions 202 of an individual insulative structure 104, the insulative structure 104 may be formed in multiple distinct processing acts. In some embodiments, one or more precursor materials employed to form the interfacial regions 202 of the insulative structures 104 are different than one or more additional precursor materials employed to form the intermediate regions 204 of the insulative structures 104. For example, the interfacial regions 202 may be formed using one or more first precursor materials (e.g., tetraethoxysilane (TEOS)). The first precursor material(s) may be deposited (e.g., through CVD), to form the interfacial regions 202 of the insulative structure 104 substantially free of the dopant 302. After a first interfacial region 202 is formed, one or more second precursor materials (e.g., silane (SiH$_4$) and oxygen (O$_2$)) for the formation of insulative material (e.g., SiO$_2$) of the insulative structure 104 may be combined with one or more third precursor materials (e.g., a carbon-containing precursor, such as one or more of carbon dioxide (CO$_2$) and methane (CH$_4$)) for the formation of the dopant 302 (e.g., carbon, boron), and may be deposited (e.g., through CVD) over one of the interfacial region 202 to form the intermediate region 204 (including the dopant 302 therein) of the insulative structure 104. After forming the intermediate region 204 of the insulative structure 104, additional amounts of the first precursor material(s) may be deposited (e.g., through additional CVD) to form the other of the interfacial regions 202 of the insulative structure 104 over the intermediate region 204.

Figure 4A:
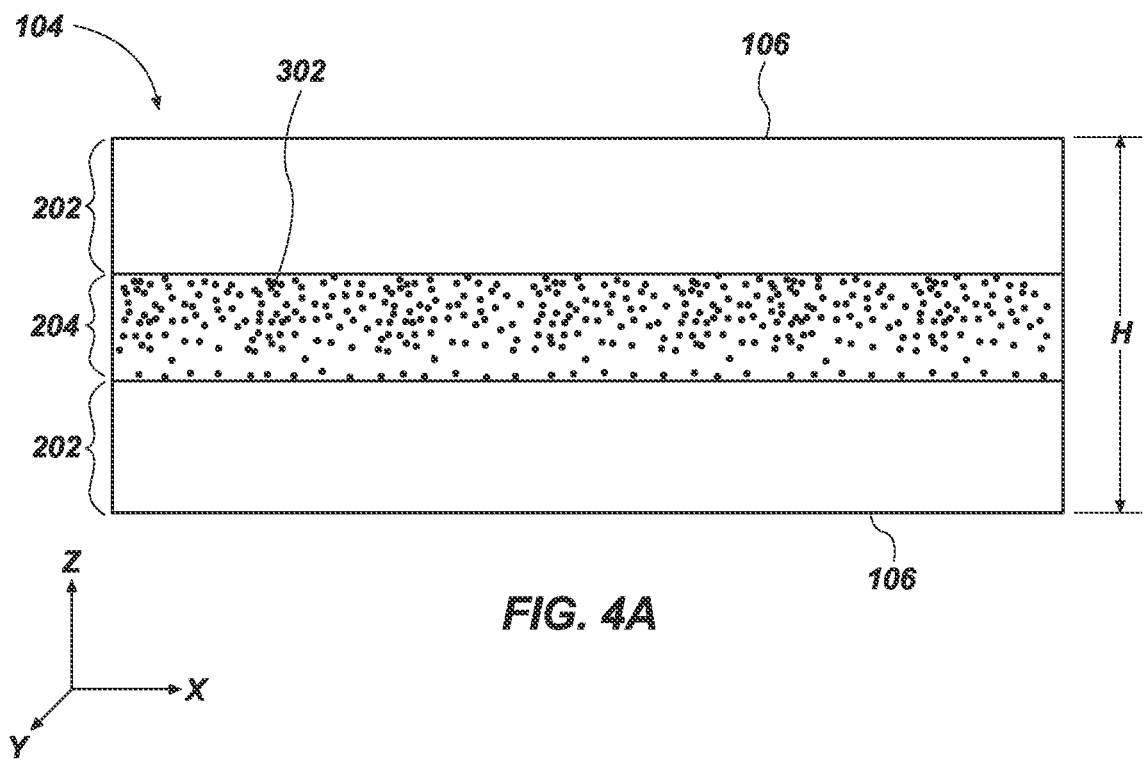
FIG. 4A illustrates an enlarged side view of one of the insulative structures of the microelectronic device structure of FIG. 1, as formed through a multi-step process, in accordance with embodiments of the disclosure.
Figure 4B:
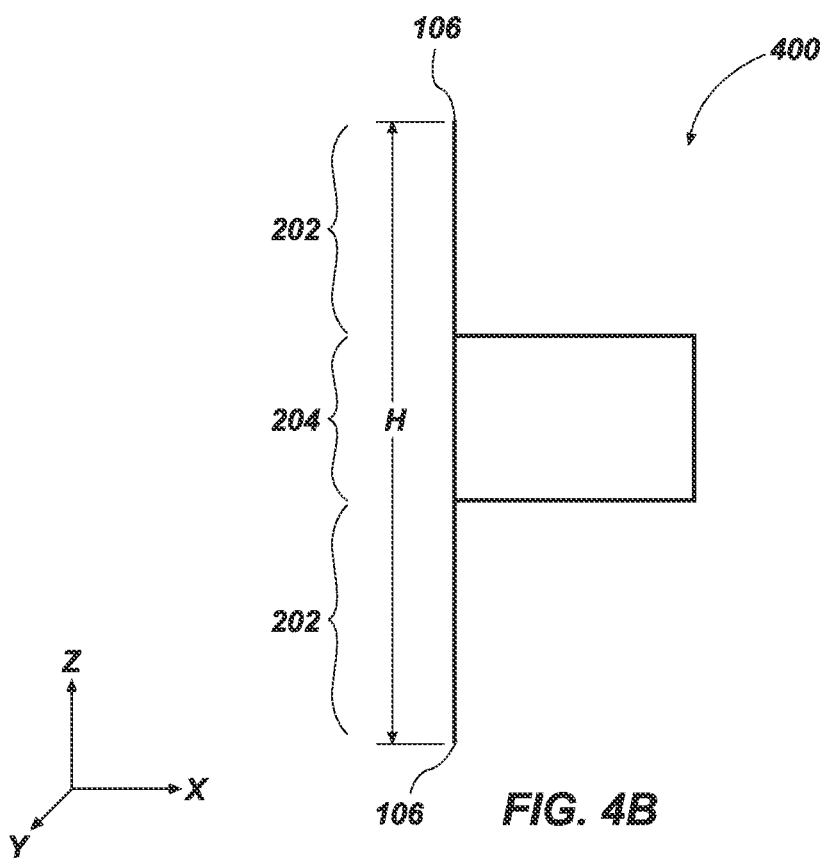
FIG. 4B illustrates a dopant concentration profile across a height of the insulative structure depicted in FIG. 4A.

FIG. 4A illustrates an enlarged side view of one of the insulative structures 104 formed through such a process. FIG. 4B illustrates a plot 400 showing a dopant concentration profile across a height H (e.g., vertical dimension) of the insulative structure 104 shown in FIG. 4A. The process may result in a substantially uniform dopant concentration within the intermediate region 204 of the insulative structure 104. The interfacial regions 202 may be substantially free of dopant 302 (FIG. 4A), such that a dopant concentration throughout the interfacial regions 202 is substantially uniform and substantially equals zero.

The intermediate region 204 may constitute less than one third (⅓) of the height H of the insulative structure 104, such that the interfacial regions 202, in combination, may constitute at least two thirds (⅔) of the height H of the insulative structure 104. For example, the insulative structure 104 may have a height H within a range of from about 10 nanometers (nm) to about 25 nm. Therefore, the intermediate region 204 may have a vertical height (e.g., thickness) of less than about 9 nm for an insulative structure 104 having a height H of about 25 nm; and the intermediate region 204 may have a height of less than about 3 nm for an insulative structure 104 having a height H of about 10 nm.

In additional embodiments, one or more precursor materials employed to form the intermediate regions 204 of the insulative structures 104 are substantially the same as one or more precursor materials employed to form the interfacial regions 202 of the insulative structures 104. For example, one or more first precursor materials (e.g., SiH$_4$ and O$_2$) for the formation of insulative material (e.g., SiO$_2$) of the insulative structure 104 may be deposited (e.g., through CVD) over the sacrificial structure 102 to form a first interfacial region 202 substantially free of the dopant 302. After forming the first interfacial region 202, the one or more first precursor materials may be combined with a one or more second precursor materials (e.g., a carbon-containing precursor, such as one or more of CO$_2$ and CH$_4$) for the formation of the dopant 302 (e.g., carbon, boron), and may be deposited (e.g., through CVD) over the first interfacial region 202 to form the intermediate region 204 (including the dopant 302 therein) of the insulative structure 104. Thereafter, one or more additional amounts of the one or more first precursor materials (e.g., SiH$_4$ and O$_2$) may be deposited (e.g., through CVD), in the absence of the second precursor materials to form a second interfacial region 202 over the intermediate region 204 of the insulative structure 104, such that the second interfacial region 202 is substantially free of the dopant 302.

Using the same first precursor materials (e.g., SiH$_4$ and O$_2$) for the formation of the interfacial regions 202 and the intermediate region 204 of the insulative structures 104 permits each insulative structure 104 to be formed through a single, continuous process (e.g., a single CVD process), which may reduce the time, complexity, and/or equipment for forming the insulative structures 104. For example, each insulative structure 104, including the interfacial regions 202 and the intermediate region 204 thereof, may be formed in situ, and without a need to purge a deposition chamber (e.g., a CVD deposition chamber) of different precursor materials that may otherwise be employed for different regions (e.g., the interfacial regions 202 and the intermediate region 204) of the insulative structure 104. For the intermediate region 204 of an individual insulative structure 104, the second precursor materials (e.g., CO$_2$, CH$_4$) may be introduced (e.g., pulsed) for a period of time less than about 30% of a total deposition time for the formation of the insulative structure 104, such as less than about 25% of the total deposition time, or less than about 20% of the total deposition time.

Figure 5A:
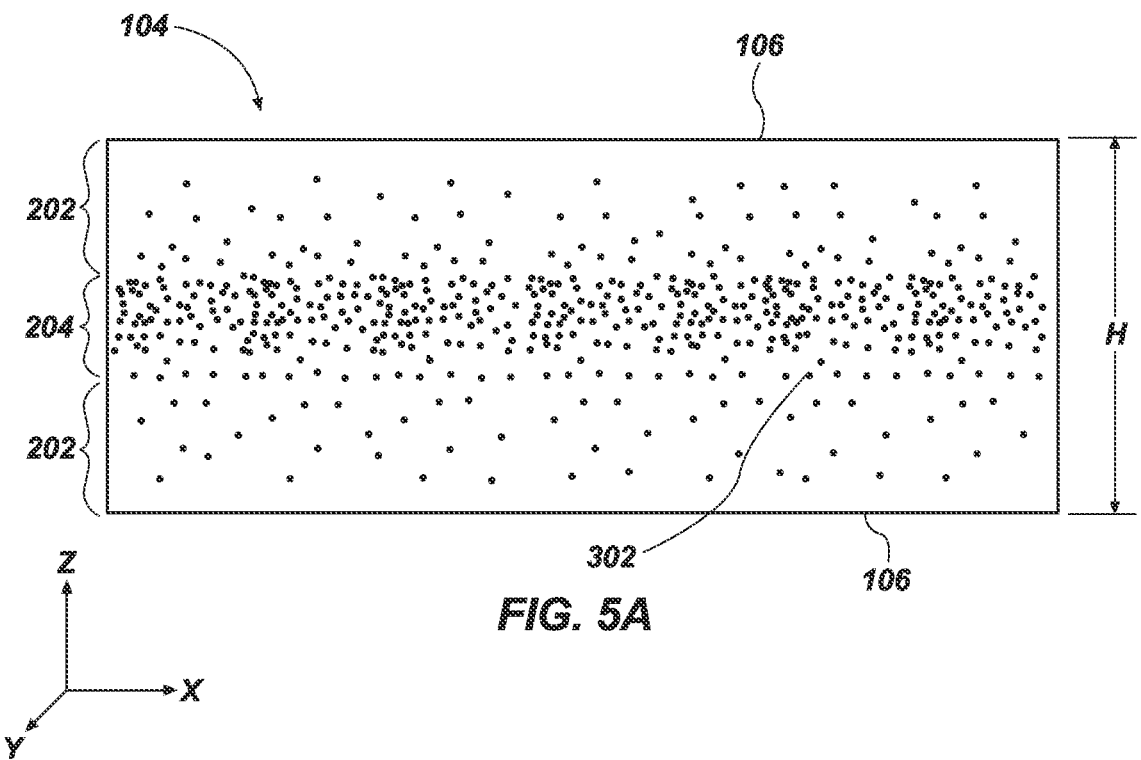
FIG. 5A is an enlarged side view of one of the insulative structures of the microelectronic device structure of FIG. 1, as formed through an additional multi-step process, in accordance with additional embodiments of the disclosure.
Figure 5B:
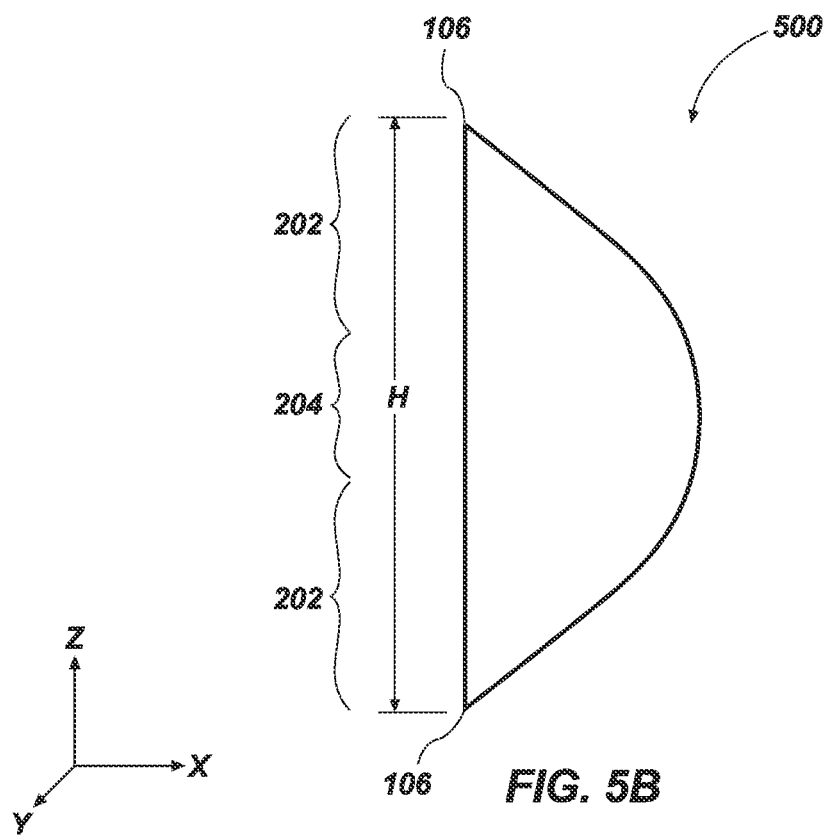
FIG. 5B illustrates a dopant concentration profile across a height of the insulative structure depicted in FIG. 5A.

FIG. 5A illustrates an enlarged side view of one of the insulative structures 104 formed through such a different process. FIG. 5B illustrates a plot 500 showing a dopant concentration profile across a height H (e.g., vertical dimension) of the insulative structure 104 shown in FIG. 5A. The multi-step process may result in a variable (e.g., non-uniform) dopant concentrations within the interfacial regions 202 and the intermediate region 204 of an individual insulative structure 104. As illustrated in FIG. 5B, dopant concentration may be relatively greater near a center of the insulative structure 104 and may be relatively smaller near the interfaces 106 of the insulative structure 104. Since the first precursor materials (e.g., $SiH_4$ and $O_2$) are combined with the second precursor materials (e.g., c-containing precursor materials, such as $CO_2$ and/or $CH_4$; b-containing precursor materials) during the formation of the intermediate region 204 of an individual insulative structure 104, relatively smaller amounts of the dopant 302 may be within the interfacial regions 202 of the insulative structure 104 as well. Thus, the dopant concentration may decrease in directions extending away from a center of the insulative structure 104. Lower dopant concentration within the interfacial regions 202 relative to the intermediate region 204 may preserve insulating properties of the insulative structure 104 and/or predictable etch rates and response in the interfaces 106 of the insulative structure 104. In addition, higher dopant concentrations in the intermediate region 204 relative to the interfacial regions 202 may enhance the rigidity of the insulative structure 104.

Figure 6A:
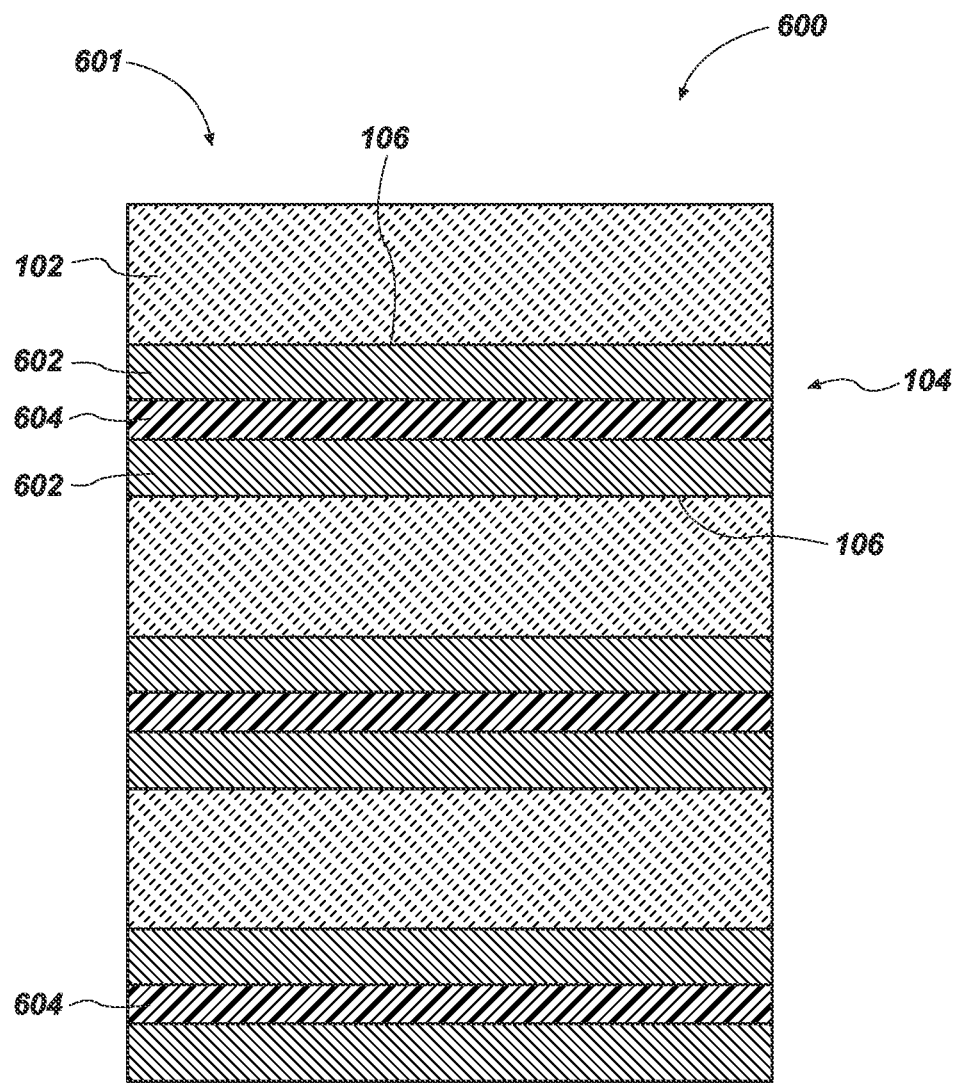
FIGS. 6A and 6B illustrate partial cross-sectional views of a microelectronic device structure at different process stages of a method of forming a microelectronic device, in accordance with embodiments of the disclosure.
Figure 6A:
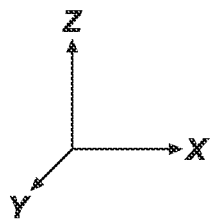
Figure 6B:
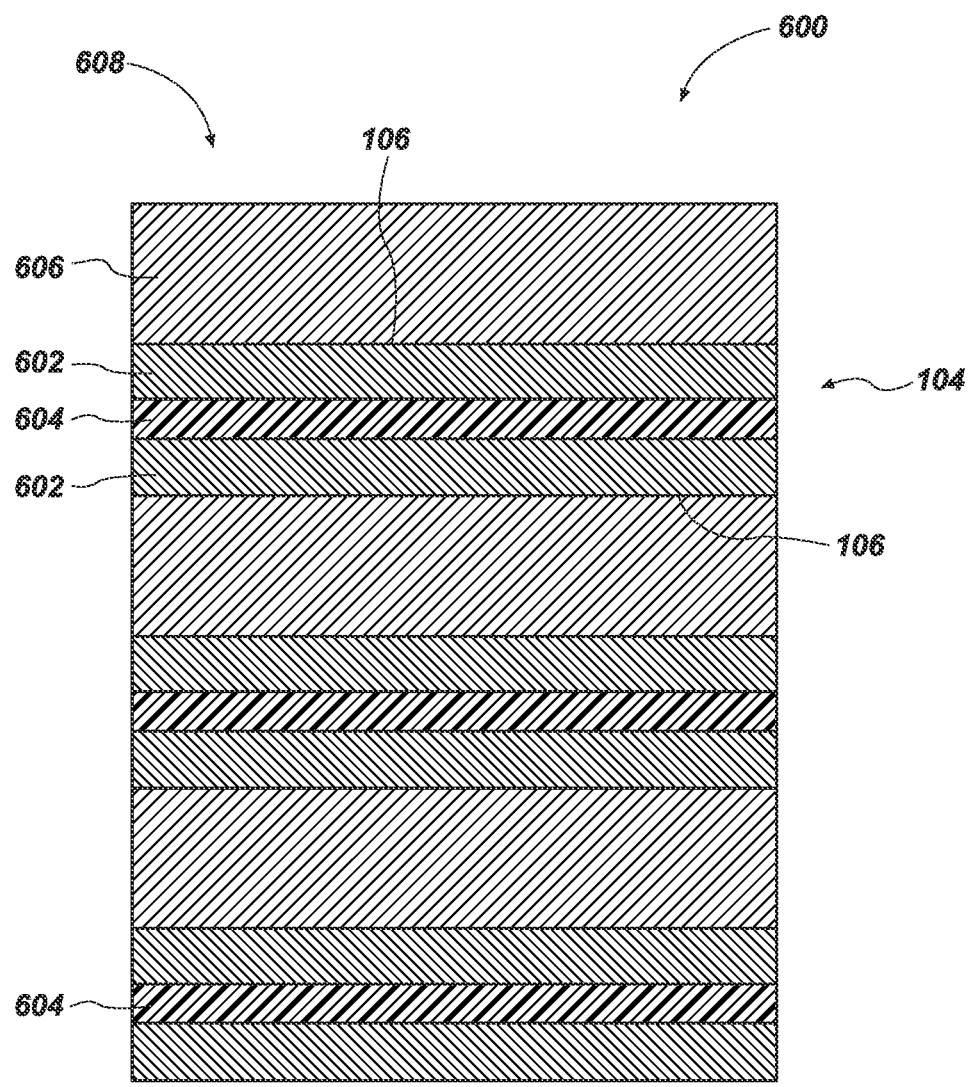

FIG. 6A and FIG. 6B are partial cross-sectional views illustrating different processing stages of a method of forming a microelectronic device structure 600, in accordance with embodiments of the disclosure. FIG. 6A illustrates an enlarged partial cross-sectional view of several of the insulative structures 104 and sacrificial structures 102 of a preliminary stack structure 601, similar to the preliminary stack structure 101 illustrated in FIG. 2. Each of the insulative structures 104 may be formed in at least three distinct layers. The layers may include a first interfacial region 602, an intermediate region 604, and a second interfacial region 602. The interfacial regions 602 may be formed from an insulative material, such as one or more of at least one dielectric oxide material (e.g., one or more of $SiO_x$, phosphosilicate glass, borosilicate glass, borophosphosilicate glass, fluorosilicate glass, $AlO_x$, $HfO_x$, $NbO_x$, $TiO_x$, $ZrO_x$, $TaO_x$, and $MgO_x$), at least one dielectric nitride material (e.g., $SiN_y$), at least one dielectric oxynitride material (e.g., $SiO_xN_y$), and at least one dielectric carboxynitride material (e.g., $SiO_xC_zN_y$). In some embodiments, each of the interfacial regions 602 is formed of and includes a dielectric oxide material, such as $SiO_x$ (e.g., $SiO_2$). The intermediate regions 604 may be formed from a second rigid material, such as carbon, boron, or calcium fluoride.

As described above, for an individual insulative structure 104, the intermediate region 604 thereof may be interposed between the interfacial regions 602 thereof. The interfacial regions 602 may comprise insulative material substantially preventing a flow of electrical current into the intermediate regions 604, such that the intermediate regions 604 may be formed from a material having relatively reduced insulative properties. The material of the intermediate regions 604 may be formulated to increase a rigidity of the insulative structure 104, which may help the insulative structures 104 to maintain their shape when the sacrificial structures 102 are removed (e.g., during subsequent replacement gate processing). Maintaining the shape of the insulative structures 104 when the sacrificial structures 102 are removed may substantially prevent undesirable tier collapse during and/or after the removal process.

The intermediate region 604 of one or more of the insulative structure(s) 104 may have a different material composition than the intermediate region 604 of one or more other of the insulative structure(s) 104. For example, an intermediate region 604 of a relatively lower insulative structure 104 may include an insulative material having a higher rigidity than the intermediate regions 604 of one or more relatively higher insulative structure(s) 104 of the preliminary stack structure 601. Relatively lower insulative structures 104 may have relatively greater horizontal lengths (e.g., in the X-direction) than relatively higher insulative structures 104. An insulative material in the intermediate region 604 of a relatively lower insulative structure 104 having relatively higher rigidity, may increase the rigidity of the relatively lower insulative structure 104 as compared to relatively higher insulative structures 104 positioned vertically above the relatively lower insulative structure 104. Increasing the rigidity of the relatively lower insulative structure 104 may reduce the risk of tier collapse across the horizontal length of the relatively lower insulative structure 104.

In some embodiments, the intermediate region 604 of one or more relatively the lower insulative structure(s) 104 may individually have a greater vertical thickness (e.g., in the Z-direction) than the intermediate region 604 of one or more relatively higher insulative structure(s) 104. The greater vertical thickness of the intermediate region 604 of the relatively lower insulative structure(s) 104 as compared to the intermediate regions 604 of the relatively higher insulative structure(s) 104 may also increase the rigidity of the relatively lower insulative structure 104 as compared to the relatively higher insulative structure(s) 104. In some embodiments, one or more relatively lower insulative structures 104 have a greater vertical thickness than one or more relatively higher insulative structure(s) 104. The greater vertical thickness of the relatively lower insulative structure(s) 104 may facilitate relatively greater vertical thicknesses of the intermediate region(s) 604 thereof.

After forming the preliminary stack structure 601, the sacrificial structures 102 may be at least partially (e.g., substantially) removed, such as through an etching process. With the sacrificial structures 102 removed, cavities may be formed between the vertically neighboring insulative structures 104. The rigid material of the intermediate regions 604 of the insulative structures 104 may strengthen the insulative structures 104, such that the insulative structures 104 may substantially retain their shape when the sacrificial structures 102 are removed. The insulative structures 104 substantially retaining their shape may permit the formed cavities to have substantially the same shape as the sacrificial structures 102.

Referring next to FIG. 6B, after the sacrificial structures 102 (FIG. 6A) are removed, the resulting cavities may be filled with conductive material to form a stack structure 608 including conductive structures 606 vertically alternating with remaining portions of the insulative structures 104. The conductive material may comprise, for example, one or more of at least one metal, at least one metal alloy, at least one conductive metal oxide, at least one conductive metal nitride, at least one conductive metal silicide, and at least one conductively-doped semiconductor material. By way of non-limiting example, the conductive structures 606 may be formed of and include one or more of tungsten (W), tungsten nitride (WN), nickel (Ni), tantalum (Ta), tantalum nitride (TaN), tantalum silicide (TaSi), platinum (Pt), copper (Cu), silver (Ag), gold (Au), aluminum (Al), molybdenum (Mo), titanium (Ti), titanium nitride (TiN$_x$), titanium silicide (TiSi$_x$), titanium silicon nitride (TiSi$_x$N$_y$), titanium aluminum nitride (TiAl$_x$N$_y$), molybdenum nitride (MoN$_x$), iridium (Ir), iridium oxide (IrO$_x$), ruthenium (Ru), ruthenium oxide (RuO$_x$), and conductively-doped silicon. In some embodiments, the conductive structures 606 are formed of and include W. In additional embodiments, the conductive structures 606 are formed of and include TiN$_x$.

Thus, in accordance with embodiments of the disclosure, a microelectronic device comprises a stack structure including insulative structures and conductive structures vertically alternating with the insulative structures. At least one of the insulative structures comprises interfacial regions proximate interfaces between the at least one of the insulative structures and two of the conductive structures vertically neighboring the at least one of the insulative structures; and an intermediate region interposed between the interfacial regions. The intermediate region has a different material composition and relatively greater strength than the interfacial regions.

Furthermore, in accordance with embodiments of the disclosure, a method of forming a microelectronic device includes forming an insulative material. An additional insulative material is formed over the insulative material. The additional insulative material has a different material composition and relatively greater strength than the insulative material. An additional amount of the insulative material is formed over the additional insulative material to form an insulative structure. A sacrificial structure is formed over the insulative structure. An additional insulative structure is formed over the sacrificial structure. The sacrificial structure is at least partially replaced with a conductive structure.

Figure 7:
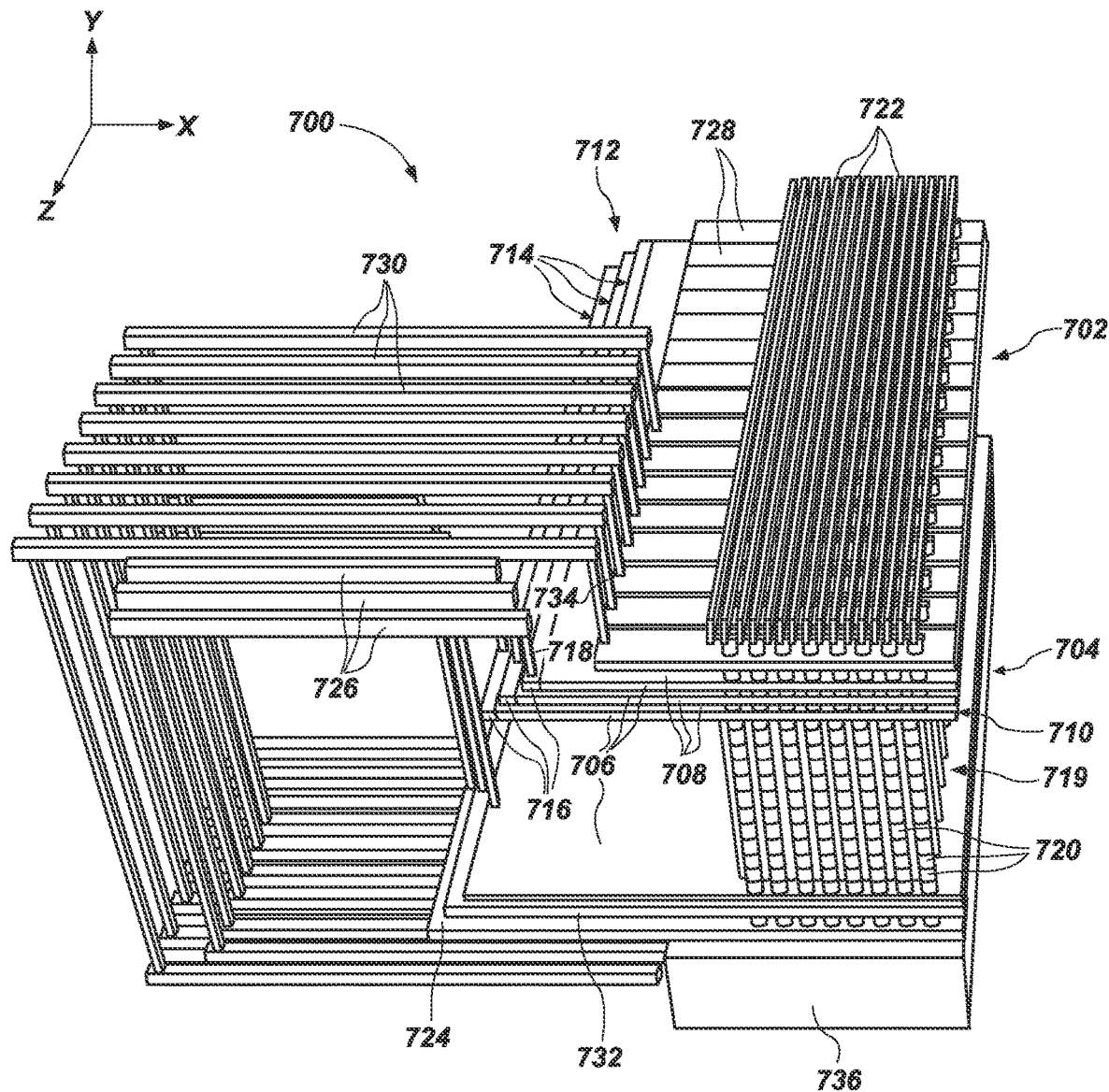
FIG. 7 is a partial, cutaway perspective view of a microelectronic device, in accordance with embodiments of the disclosure.

Microelectronic device structures (e.g., the microelectronic device structures 100, 600 previously described with reference to FIG. 3C and/or FIG. 6B) of the disclosure may be included in microelectronic devices of the disclosure. For example, FIG. 7 illustrates a partial cutaway perspective view of a portion of a microelectronic device 700 (e.g., a memory device, such as a 3D NAND Flash memory device) including a microelectronic device structure 702. The microelectronic device structure 702 may be substantially similar to the microelectronic device structures 100, 600 at the processing stage previously described with reference to FIG. 3C and/or FIG. 6B. In some embodiments, the microelectronic device structure 702 is formed through one or more of the processes previously described with reference to FIGS. 1 through 6B.

As shown in FIG. 7, the microelectronic device structure 702 may include a stack structure 704 including a vertically alternating (e.g., in the Z-direction) sequence of conductive structures 706 and insulative structures 708 arranged in tiers 710; a staircase structure 712 having steps 714 defined by edges (e.g., horizontal ends in the X-direction) of the tiers 710; composite pad structures 716 on portions of the tiers 710 of the stack structure 704 at the steps 714 of the staircase structure 712; and contact structures 718 extending through the composite pad structures 716 and contacting (e.g., physically contacting, electrically contacting) to the conductive structures 706 of the tiers 710 of the stack structure 704 at the steps 714 of the staircase structure 712. The stack structure 704, the conductive structures 706, and the insulative structures 708 may respectively be substantially similar to the stack structure 308, 608, the conductive structures 306, 606, and the insulative structures 104 previously described with reference to FIG. 3C and/or FIG. 6B. The microelectronic device 700 also includes additional features (e.g., structures, devices) operatively associated with the microelectronic device structure 702, as described in further detail below.

The microelectronic device 700 may further include vertical strings 719 of memory cells 720 coupled to each other in series, digit line structures 722 (e.g., bit line structures), a source structure 724, access line routing structures 726, first select gates 728 (e.g., upper select gates, drain select gates (SGDs)), select line routing structures 730, second select gates 732 (e.g., lower select gates, source select gates (SGSs)), and additional contact structures 734. The vertical strings 719 of memory cells 720 extend vertically and orthogonal to conductive lines and tiers (e.g., the digit line structures 722, the source structure 724, the tiers 710 of the stack structure 704, the access line routing structures 726, the first select gates 728, the select line routing structures 730, the second select gates 732). In some embodiments, the memory cells 720 comprise so-called "MONOS" (metal-oxide-nitride-oxide-semiconductor) memory cells. In additional embodiments, the memory cells 720 comprise so-called "TANOS" (tantalum nitride-aluminum oxide-nitride-oxide-semiconductor) memory cells, or so-called "BETANOS" (band/barrier engineered TANOS) memory cells, each of which are subsets of MONOS memory cells. In further embodiments, the memory cells 720 comprise so-called "floating gate" memory cells. The conductive contact structures 718 and the additional contact structures 734 may electrically couple components to each other as shown (e.g., the select line routing structures 730 to the first select gates 728, the access line routing structures 726 to the tiers 710 of the stack structure 704 of the microelectronic device structure 702).

The microelectronic device 700 may also include a base structure 736 positioned vertically below the vertical strings 719 of memory cells 720. The base structure 736 may include at least one control logic region including control logic devices configured to control various operations of other features (e.g., the vertical strings 719 of memory cells 720) of the microelectronic device 700. As a non-limiting example, the control logic region of the base structure 736 may further include one or more (e.g., each) of charge pumps (e.g., VCCP charge pumps, VNEGWL charge pumps, DVC2 charge pumps), delay-locked loop (DLL) circuitry (e.g., ring oscillators), Vdd regulators, drivers (e.g., string drivers), page buffers, decoders (e.g., local deck decoders, column decoders, row decoders), sense amplifiers (e.g., equalization (EQ) amplifiers, isolation (ISO) amplifiers, NMOS sense amplifiers (NSAs), PMOS sense amplifiers (PSAs)), repair circuitry (e.g., column repair circuitry, row repair circuitry), I/O devices (e.g., local I/O devices), memory test devices, MUX, error checking and correction (ECC) devices, self-refresh/wear leveling devices, and other chip/deck control circuitry. The control logic region of the base structure 736 may be coupled to the source structure 724, the access line routing structures 726, the select line routing structures 730, and the digit line structures 722. In some embodiments, the control logic region of the base structure 736 includes CMOS (complementary metal-oxide-semiconductor) circuitry. In such embodiments, the control logic region of the base structure 736 may be characterized as having a "CMOS under Array" ("CuA") configuration.

Thus, in accordance with embodiments of the disclosure, a memory device comprises a stack structure, a staircase structure, digit line structures, a source structure, strings of memory cells, and a control device. The stack structure comprises tiers each comprising a conductive structure and an insulative structure vertically neighboring the conductive structure. The insulative structure of at least some of the tiers individually comprise a lower region comprising silicon oxide, an upper region comprising additional silicon oxide, and a middle region vertically interposed between the lower region and the upper region and comprising one or more of carbon-doped silicon oxide and boron-doped silicon oxide. The staircase structure has steps comprising edges of at least some of the tiers of the stack structure. The digit line structures overlie the stack structure. The source structure underlies the stack structure. The strings of memory cells vertically extend through the stack structure and are electrically connected to the source structure and the digit line structures. The control device vertically underlies the source structure and comprises complementary metal-oxide-semiconductor (CMOS) circuitry.

Figure 8:
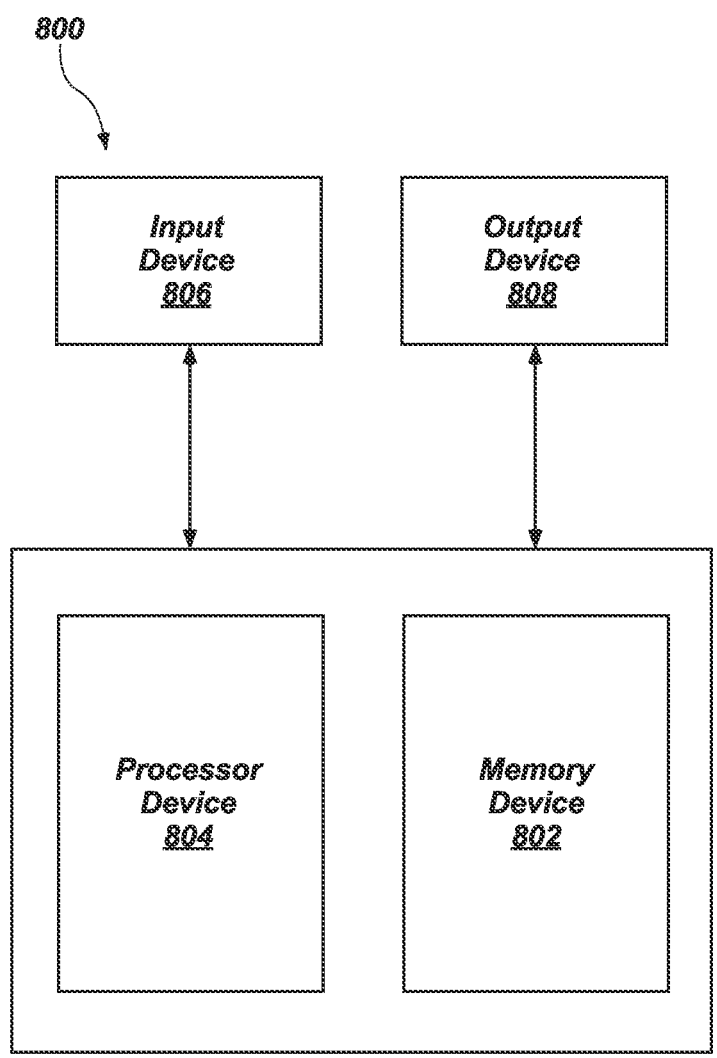
FIG. 8 is a schematic block diagram of an electronic system in accordance with one or more embodiments of the disclosure.

Microelectronic devices (e.g., the microelectronic device 700 previously described with reference to FIG. 7) may be included in embodiments of electronic systems of the disclosure. For example, FIG. 8 is a block diagram of an electronic system 800, in accordance with embodiments of the disclosure. The electronic system 800 may comprise, for example, a computer or computer hardware component, a server or other networking hardware component, a cellular telephone, a digital camera, a personal digital assistant (PDA), portable media (e.g., music) player, a Wi-Fi or cellular-enabled tablet such as, for example, an iPAD® or SURFACE® tablet, an electronic book, a navigation device, etc. The electronic system 800 includes at least one memory device 802. The memory device 802 may include, for example, an embodiment of a microelectronic device structure herein (e.g., the microelectronic device structure 100, previously described with reference to FIGS. 3A through 5B, of the microelectronic device structure 600, previously described with reference to FIGS. 6A through 6B) and microelectronic device (e.g., the microelectronic device 700 previously described with reference to FIG. 7).

The electronic system 800 may further include at least one electronic signal processor device 804 (often referred to as a "microprocessor"). The electronic signal processor device 804 may, optionally, include an embodiment of one or more of a microelectronic device and a microelectronic device structure previously described herein. The electronic system 800 may further include one or more input devices 806 for inputting information into the electronic system 800 by a user, such as, for example, a mouse or other pointing device, a keyboard, a touchpad, a button, or a control panel. The electronic system 800 may further include one or more output devices 808 for outputting information (e.g., visual or audio output) to a user such as, for example, a monitor, a display, a printer, an audio output jack, a speaker, etc. In some embodiments, the input device 806 and the output device 808 may comprise a single touchscreen device that can be used both to input information to the electronic system 800 and to output visual information to a user. The input device 806 and the output device 808 may communicate electrically with one or more of the memory device 802 and the electronic signal processor device 804.

Thus, in accordance with embodiments of the disclosure, an electronic system includes an input device, an output device, a processor device operably connected to the input device and the output device, and a memory device operably connected to the processor device. The memory device includes a stack structure comprising conductive structures vertically alternating with insulative structures. At least one of the insulative structures individually includes interfacial regions extending inward from vertical boundaries of the at least one of the insulative structures and comprising insulative material. The insulative structures further include an additional region between the interfacial regions and comprising additional insulative material having one or more of relative greater strength and relatively greater rigidity than the insulative material of the interfacial regions. The memory device further includes a source structure underlying the stack structure. The memory device also includes digit line structures overlying the stack structure. The memory device further includes strings of memory cells extending through the stack structure and coupled to the source structure and the digit line structures. The memory device also includes control logic circuitry underlying the source structure and coupled to the conductive structures.

The methods and structures of the disclosure may increase a strength and/or rigidity of insulative structures of stack structure of a microelectronic device of the disclosure. Increasing the strength and/or rigidity of the insulative structures may facilitate reducing the thickness of tiers of the stack structure. Reducing the thickness of the tiers, may permit a feature density of the microelectronic device to increase relative to conventional microelectronic device configurations. Increasing a feature density of the microelectronic device, may facilitate the fabrication of relatively smaller microelectronic devices, which in turn may reduce the space needed for the microelectronic devices in associated electronic devices and systems. Similarly, increasing the feature density of the microelectronic device may facilitate relatively greater power and memory functionality per unit area. Relatively enhanced power and memory functionality may permit microelectronic devices and electronic systems of the disclosure to have enhanced performance, relative to conventional microelectronic devices and conventional electronic systems, without an increase in size. Furthermore, increasing the strength and/or rigidity of the insulative structures of a microelectronic device, may reduce the number of failed microelectronic devices during and/or soon after production. Reducing the number of failures may increase the efficiency of the production of the microelectronic devices, which may result in relatively reduced costs.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A microelectronic device, comprising:
a stack structure comprising insulative structures and conductive structures vertically alternating with the insulative structures, at least one of the insulative structures comprising:
interfacial regions proximate interfaces between the at least one of the insulative structures and two of the conductive structures vertically neighboring the at least one of the insulative structures and extending inward from vertical boundaries of the insulative structures, the interfacial regions comprising a first insulative material; and an intermediate region interposed between the interfacial regions and having a thickness less than one third of an overall thickness of the at least one of the insulative structures, the intermediate region having a different material composition and relatively greater strength than the interfacial regions and comprising a second insulative material doped with at least one dopant selected from carbon, boron, and calcium fluoride.

2. The microelectronic device of claim 1, wherein the intermediate region has a heterogeneous distribution of the at least one dopant across a vertical thickness thereof.

3. The microelectronic device of claim 1, wherein the intermediate region has a substantially homogeneous distribution of the at least one dopant across a vertical thickness thereof.

4. The microelectronic device of claim 1, wherein the interfacial regions comprise an additional insulative material, the interfacial regions individually including a smaller amount of the at least one dopant than the intermediate region.

5. The microelectronic device of claim 1, wherein the interfacial regions comprise an additional insulative material, and wherein the interfacial regions are substantially free of the at least one dopant.

6. The microelectronic device of claim 1, wherein each of the insulative structures comprises a dielectric oxide material.

7. The microelectronic device of claim 1, wherein each of the insulative structures individually comprises the interfacial regions and the intermediate region, the intermediate region of each of the insulative structures comprising one or more of carbon-doped silicon dioxide and boron-doped silicon dioxide.

8. The microelectronic device of claim 7, wherein the interfacial regions of each of the insulative structures each comprise silicon dioxide substantially free of carbon and boron.

9. An electronic system comprising:
an input device;
an output device;
a processor device operably connected to the input device and the output device; and
a memory device operably connected to the processor device and comprising:
a stack structure comprising conductive structures vertically alternating with insulative structures, at least one of the insulative structures individually comprising:
interfacial regions extending inward from vertical boundaries of the at least one of the insulative structures and comprising an insulative material; and
an additional region between the interfacial regions and comprising an additional insulative material having one or more of relative greater strength and relatively greater rigidity than the insulative material of the interfacial regions;
a source structure underlying the stack structure;
digit line structures overlying the stack structure;
strings of memory cells extending through the stack structure and coupled to the source structure and the digit line structures; and
a control logic circuitry underlying the source structure and coupled to the conductive structures.

10. The electronic system of claim 9, wherein the additional insulative material of the additional region comprises silicon oxide doped with one or more of carbon, boron, and calcium fluoride.

11. The electronic system of claim 10, wherein the at least one of the insulative structures comprises at least two of the insulative structures, the additional insulative material of a relatively vertically lower one of the at least two of the insulative structures having a relatively greater concentration of the one or more of carbon, boron, and calcium fluoride than the additional insulative material of a relatively vertically higher one of the at least two of the insulative structures.

12. The electronic system of claim 9, wherein the at least one of the insulative structures comprises at least two of the insulative structures, a relatively vertically lower one of the at least two of the insulative structures having a relatively greater vertical thickness than a relatively vertically higher one of the at least two of the insulative structures.

13. The electronic system of claim 9, wherein the insulative material of the interfacial regions comprises additional silicon oxide substantially free of the one or more of carbon, boron, and calcium fluoride.

14. A memory device, comprising:
a stack structure comprising tiers each comprising a conductive structure and an insulative structure vertically neighboring the conductive structure, the insulative structure of one or more of the tiers individually comprising:
a lower region comprising silicon oxide;
an upper region comprising additional silicon oxide; and
a middle region vertically interposed between the lower region and the upper region and comprising one or more of carbon-doped silicon oxide and boron-doped silicon oxide;
a staircase structure having steps comprising edges of at least some of the tiers of the stack structure;
digit line structures overlying the stack structure;
a source structure underlying the stack structure;
strings of memory cells vertically extending through the stack structure and electrically connected to the source structure and the digit line structures; and
a control device vertically underlying the source structure and comprising a complementary metal-oxide-semiconductor (CMOS) circuitry.

15. The memory device of claim 14, wherein:
the one or more of the tiers comprises:
a first tier; and
a second tier vertically overlying the first tier; and
a concentration of one or more of carbon and boron within the middle region of the insulative structure of the first tier is greater than a concentration of the one or more of carbon and boron within the middle region of the insulative structure of the second tier.

16. The memory device of claim 14, wherein:
the one or more of the tiers comprises:
a first tier; and
a second tier vertically overlying the first tier; and
a vertical thickness of the insulative structure of the first tier is greater than a vertical thickness of the insulative structure of the second tier.

* * * * *